United States Patent [19]
Adderley et al.

[11] 3,918,993
[45] Nov. 11, 1975

[54] ELECTRIC BATTERY TERMINAL SEALS

[75] Inventors: Edward Adderley, Hadfield; Derek Kurt Schwendener, Wilmslow, both of England

[73] Assignee: Electric Power Storage Limited, London, England

[22] Filed: Apr. 2, 1974

[21] Appl. No.: 457,187

[30] Foreign Application Priority Data
Apr. 3, 1973 United Kingdom............... 15986/73

[52] U.S. Cl.............................. 136/135 S; 136/168
[51] Int. Cl............................................. H01m 1/02
[58] Field of Search...................... 136/135, 168

[56] References Cited
UNITED STATES PATENTS

| | | | |
|---|---|---|---|
| 1,263,500 | 4/1918 | Willard | 136/168 |
| 1,402,673 | 1/1922 | Skinner et al | 136/168 |
| 1,434,307 | 10/1922 | Miller | 136/168 |
| 1,926,157 | 9/1933 | Lormor et al | 136/168 |
| 3,522,105 | 7/1970 | Sabatino | 136/168 |

FOREIGN PATENTS OR APPLICATIONS
341,870    12/1959    Switzerland...................... 136/168

*Primary Examiner*—Donald L. Walton

[57] ABSTRACT

A terminal seal for an electric storage battery is formed by a body of polypropylene sealing material in an annular well whose outer wall is afforded by the battery lid while its inner wall is afforded by the terminals post and the bottom of the well is also afforded by a shoulder which is carried by the terminal post and fits within the outer wall. The terminal post has in it a vertical bore with its upper end open and one or more lateral passages extending generally radially from its lower end to the annular well and filled with the sealing material. The sealing materials of different terminals may be of different colours. The sealing material is injected into the annular well either through the axial bore and radial passages, or by a tool comprising a heated reservoir communicating with a nozzle opening through an annular mask shaped to fit over the terminal post and cover the top of the annular well.

3 Claims, 4 Drawing Figures

ELECTRIC BATTERY TERMINAL SEALS

This invention relates to terminal seals of electric storage batteries.

According to one aspect of the present invention a terminal seal in an electric storage battery is formed by a body of sealing material in an annular well whose outer wall is afforded by the battery lid while its inner wall is afforded by the terminal post and the bottom of the well is also afforded by a shoulder which is carried by the terminal post and fits within the outer wall.

The sealing material may comprise polypropylene.

According to a further aspect of the present invention a terminal seal in an electric storage battery is formed by a body of sealing material in an annular well whose outer wall is afforded by the battery lid while its inner wall is afforded by the terminal post, the terminal post having in it a vertical bore with its upper end open and one or more lateral passages extending generally radially from its lower end to the annular well and being filled with the sealing material. Thus the axial bore and radial passages provide a convenient way of injecting the sealing material into the annular well, and in the finished battery the sealing material in the radial bores provides a key preventing relative turning of the terminal post about its axis.

In an alternative form of the invention the sealing material is injected into the well by a tool comprising a heated reservoir communicating with a nozzle opening through an annular mask shaped to fit over the terminal post and cover the top of the annular well.

The invention may be put into practice in various ways but certain specific embodiments will be described by way of example, with reference to the accompanying drawings in which.

Figure 1:
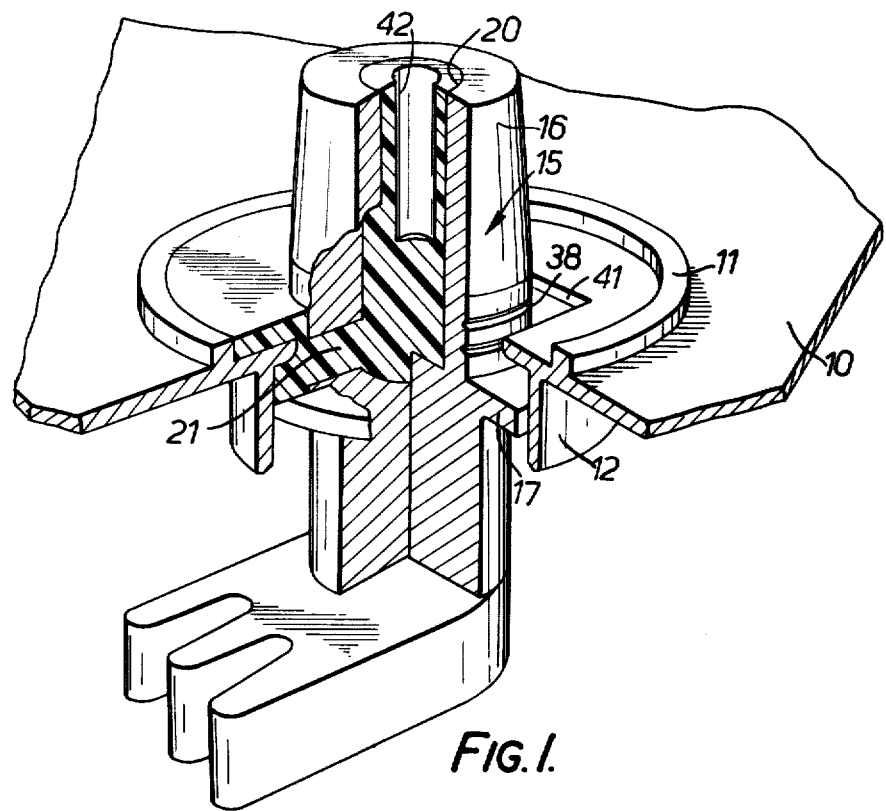
FIG. 1 is a broken away perspective view of one form of terminal seal.

In each embodiment the battery has a lid 10 formed with an opening for the terminal post provided with tubular flanges 11 and 12 extending respectively above and below the plane of the lid. The terminal post comprises a cylindrical bar 15 with the usual slightly tapered upper end portion 16, and with a radially projecting annular flange 17 which is a close fit in the lower part of the tubular flange round the hole in the lid.

Figure 2:
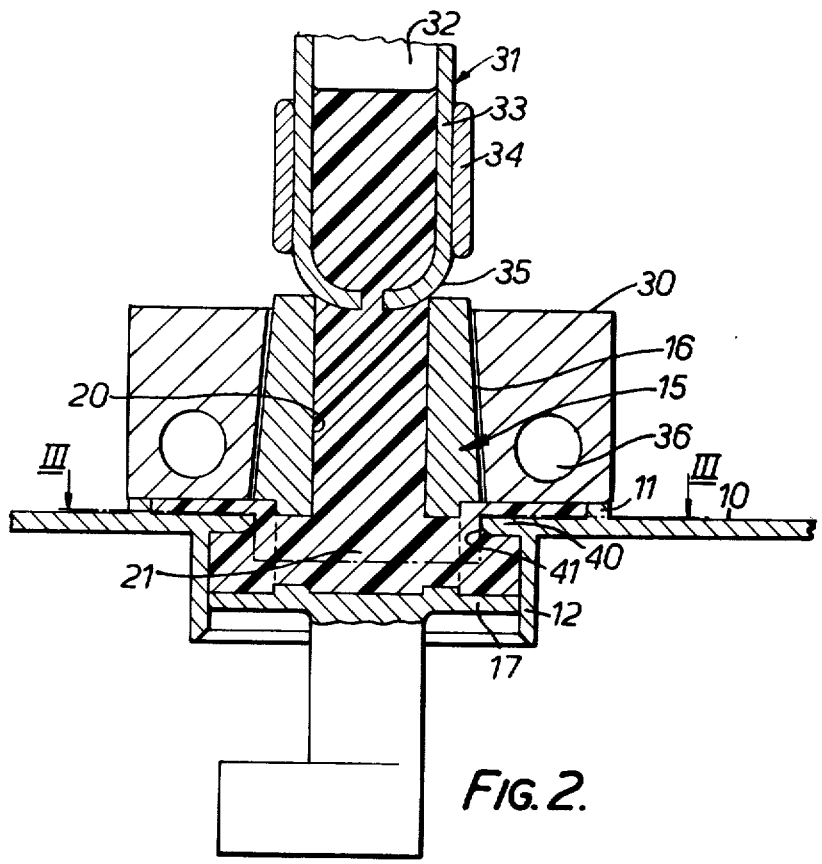
FIG. 2 is a sectional elevation corresponding to FIG. 1, but slightly modified, and showing a moulding head applied to the assembly for sealing it.
Figure 3:
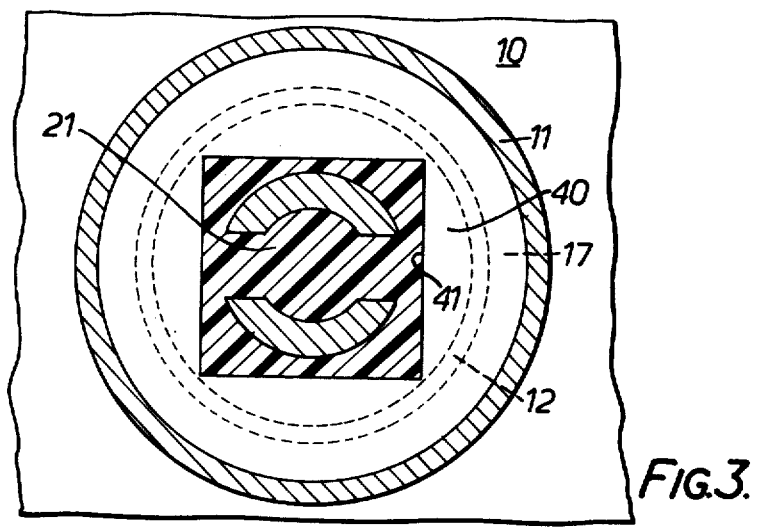
FIG. 3 is a section on the line III—III of FIG. 2.

In the arrangement of FIG. 1 to 3 the terminal post has in it an axial bore 20 with its upper end open and its lower end forming an inverted T-junction with a diametral passage 21, conveniently a slot of greater height than width, opening into the well just above the flange.

In this arrangement the sealing material is injected through the axial bore and diametral passage. Thus as shown in FIG. 2 a moulding block 30 having in it an annular cooling passage 36 is placed over the terminal post, resting on the upstanding tubular flange 11 of the lid so as to close the annular well. A moulding head 31 incorporating a plunger 32 in a cylinder 33 provided with a heater 34 and communicating with an injection nozzle 35 is then applied to the bore of the terminal post, and polypropylene in a plastic state is injected through the nozzle to fill the annular well and the space formed by the bore in the terminal post and the diametral slot at the bottom.

This provides a convenient way of injecting the plastic sealing material, and the plastics material in the diametral slot provides a key to prevent relative rotation between the pillar and the sealing material.

The cylindrical surface of the terminal post may be grooved as at 38 in FIG. 1 to prevent axial movement relatively to the sealing material.

Friction and adhesion between the sealing material and the lid may be relied upon, or alternatively the lid may be provided with a non-circular surface to provide a positive key, to prevent rotation of the sealing material relatively to it. For example, as shown in FIGS. 2 and 3, segmental portions 40 of the wall of the lid may extend inwards beyond the tubular flanges to leave in a square hole 41 at a level leaving a clearance for sealing material above the flange 17 of the terminal post. This has the advantage of increasing the leakage path past the seal.

A hole 42 may be formed in the injected sealing material to receive a self tapping screw. This may be done by a cold pin while the material is soft, or a hot pin when it has cooled. Alternatively the nozzle 35 may be modified to form such a hole in the moulding. Using polypropylene as the sealing material this may provide a stronger screw-thread than would be obtained in a post formed only of lead.

Figure 4:
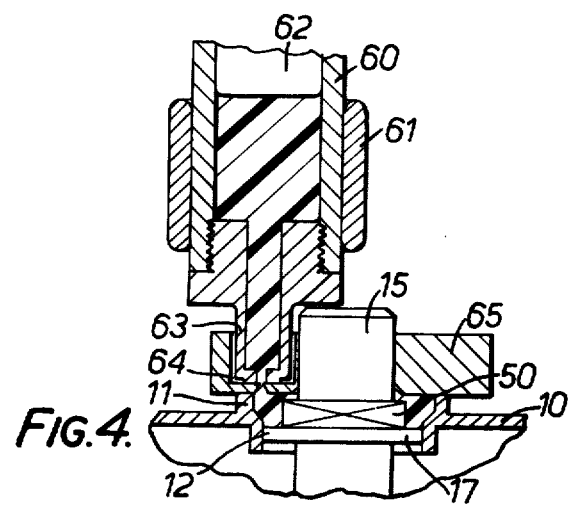
FIG. 4 is a view similar to FIG. 2 of a modified arrangement.

In the alternative embodiment shown in FIG. 4 the terminal post is formed without the axial bore 20 and lateral passages 21 but above the projecting flange has a square section 50 to prevent rotation.

To effect the seal in this construction, when the lid has been secured, by heat sealing, on the casing which is of polypropylene, a tool is used comprising a heated cylinder 60 provided with a heater 61 and containing a plunger 62 and having a nozzle 63 at its lower end opening through a hole 64 in an annular mask 65. Thus the mask is fitted over the top part of the terminal post so as to close the annular well formed by the terminal post, its radial flange 17 and the tubular flange 11 of the lid. The cylinder contains polypropylene which is heated to a plastic condition by the heater and is injected into the annular well by means of the plunger. If necessary the mask and tool can be turned about the axis of the terminal to distribute the material in the well as it is ejected.

The arrangements described are simple and have the advantage that they can accommodate considerable variation in the level of the terminal relatively to that of the lid. This is particularly desirable where the lid is secured to the casing by heat sealing which may result in some variation of the level of the lid. The sealing material of the terminals may be differently coloured to indicate polarity.

What I claim as my invention and desire to secure by Letters Patent is:

1. An electric storage battery having a terminal seal formed by a body of sealing material in an annular well whose outer wall is afforded by the battery lid while its inner wall is afforded by the terminal post, the terminal post having in it a vertical bore with its upper end open and one or more lateral passages extending generally radially from its lower end to the annular well and being filled with the sealing material.

2. A battery as claimed in claim 1 in which the sealing material comprises polypropylene.

3. A battery as claimed in claim 1 having two terminal seals wherein the sealing materials are of different colours.

* * * * *